United States Patent
Lei et al.

(10) Patent No.: US 11,373,279 B2
(45) Date of Patent: Jun. 28, 2022

(54) IMAGE PROCESSING METHOD AND DEVICE

(71) Applicant: ArcSoft Corporation Limited, Zhejiang (CN)

(72) Inventors: Hua Lei, Zhejiang (CN); Kai Chen, Zhejiang (CN); Lizhen Wang, Zhejiang (CN)

(73) Assignee: ArcSoft Corporation Limited, Hangzhou (CN)

( * ) Notice: Subject to any disclaimer, the term of this patent is extended or adjusted under 35 U.S.C. 154(b) by 0 days.

(21) Appl. No.: 16/419,013

(22) Filed: May 22, 2019

(65) Prior Publication Data

US 2020/0065949 A1    Feb. 27, 2020

(30) Foreign Application Priority Data

Aug. 22, 2018    (CN) .......................... 201810961926.5

(51) Int. Cl.
*G06T 5/00* (2006.01)
*G06T 5/50* (2006.01)

(52) U.S. Cl.
CPC ............... *G06T 5/009* (2013.01); *G06T 5/50* (2013.01); *G06T 2207/10016* (2013.01); *G06T 2207/10024* (2013.01); *G06T 2207/20024* (2013.01); *G06T 2207/20221* (2013.01)

(58) Field of Classification Search
CPC .................................................... G06T 5/009
USPC ......................................................... 345/589
See application file for complete search history.

(56) References Cited

U.S. PATENT DOCUMENTS

| | | | | |
|---|---|---|---|---|
| 6,747,757 B1* | 6/2004 | Enomoto | ........... | H04N 9/04517 358/1.9 |
| 9,495,783 B1* | 11/2016 | Samarasekera | ...... | H04N 5/2258 |
| 2005/0212970 A1* | 9/2005 | Joskin | ................ | H04N 21/2343 348/572 |
| 2007/0147690 A1* | 6/2007 | Ishiwata | ................ | H04N 19/20 382/232 |
| 2008/0158410 A1* | 7/2008 | Lin | ........................ | H04N 5/235 348/364 |
| 2009/0067723 A1* | 3/2009 | Yamazaki | ...... | H04N 21/440263 382/181 |
| 2010/0106506 A1* | 4/2010 | Carter | ..................... | G10L 13/00 704/260 |

(Continued)

FOREIGN PATENT DOCUMENTS

| | | |
|---|---|---|
| CN | 101964863 A | 2/2011 |
| CN | 20150110722 A | 10/2015 |

(Continued)

OTHER PUBLICATIONS

"Effect of Smoothing Filters on Time-Domain Waveform Image Segmentation" Kedir Kamu et al., Jul. 2017, Article No. 19, pp. 1-7.*

(Continued)

*Primary Examiner* — Javid A Amini
(74) *Attorney, Agent, or Firm* — Gang Yu (57) ABSTRACT

An image processing method and device is provided. The method includes: performing brightness adjustment on each frame of image in a video; performing offset compensation on each frame of image after the brightness adjustment; and performing time domain filtering on each frame of image after the offset compensation.

20 Claims, 3 Drawing Sheets

---

A current frame of image after the brightness adjustment and a previous frame of image after the brightness adjustment are divided separately into multiple second block images    / S301

An offset between a second block image corresponding to the current frame of the image and a second block image corresponding to the previous frame of the image is calculated    / S302

At least one second block image including the at least one moving object is eliminated from the multiple second block images, and an average value of offsets of the remaining second block images is taken as an offset between the current frame of the image and the previous frame of the image    / S303

(56) References Cited

U.S. PATENT DOCUMENTS

| | | | | |
|---|---|---|---|---|
| 2010/0124383 | A1* | 5/2010 | Wang | G06T 3/4053 |
| | | | | 382/299 |
| 2010/0225679 | A1* | 9/2010 | Guncer | G09G 3/342 |
| | | | | 345/690 |
| 2012/0240005 | A1* | 9/2012 | Choi | G06F 11/10 |
| | | | | 714/755 |
| 2013/0169834 | A1* | 7/2013 | Herz | G06T 5/50 |
| | | | | 348/220.1 |
| 2013/0326398 | A1* | 12/2013 | Zuverink | G06F 3/0488 |
| | | | | 715/784 |
| 2014/0035904 | A1* | 2/2014 | Ge | G06T 15/00 |
| | | | | 345/419 |
| 2014/0368912 | A1* | 12/2014 | Imada | H04N 5/23245 |
| | | | | 359/557 |
| 2016/0006978 | A1* | 1/2016 | Satoh | H04N 5/23258 |
| | | | | 386/269 |
| 2017/0209125 | A1* | 7/2017 | Rai | G06F 3/0488 |
| 2017/0330330 | A1* | 11/2017 | Seki | H04N 7/181 |
| 2017/0330434 | A1* | 11/2017 | Takahashi | G08B 13/19645 |
| 2017/0359533 | A1* | 12/2017 | Higuchi | H04N 5/235 |
| 2019/0028766 | A1* | 1/2019 | Wold | H04N 21/4665 |
| 2019/0116646 | A1* | 4/2019 | Wang | H04N 21/4882 |
| 2019/0385548 | A1* | 12/2019 | Chen | G09G 3/3688 |
| 2020/0159989 | A1* | 5/2020 | Banaszak | G06K 9/00993 |
| 2020/0202116 | A1* | 6/2020 | Yamamoto | G06T 7/215 |

FOREIGN PATENT DOCUMENTS

| | | |
|---|---|---|
| JP | H04-002278 A | 7/1992 |
| JP | H11122513 A | 4/1999 |
| JP | 2008109370 A | 5/2008 |
| JP | 2008160733 A | 7/2008 |
| JP | 2010258710 A | 11/2010 |
| JP | 2013236249 A | 11/2013 |
| KR | 20030002608 A | 1/2003 |
| KR | 20110118376 A | 10/2011 |
| WO | 2015119207 A1 | 8/2015 |

OTHER PUBLICATIONS

"The Trilateral Filter for High Contrast Images and Meshes" Prasun Choudhury et al., Eurographics Symposium on Rendering 2003, pp. 1-11.*

"Real Time Light Field Reconstruction for Sub-pixel Based Integral Imaging Display" Shaohui Jiao et al., SIGGRAPH Asia 2014, Dec. 3-6, 2014.*

"Adaptive Interpolation Filter Scheme in AV1" Ching-Han Chiang et al., 2017 IEEE.*

"Content Based Automatic Zooming: Viewing Documents on Small Displays" Patrick Chiu, et al., Oct. 26-31, 2008, ACM.*

TW first Office Action dated Feb. 21, 2020 re: Application No. 108119192, pp. 1-8.

JP first Office Action dated Sep. 4, 2020 re: Application No. 2019-132704, pp. 1-4.

KR first Office Action dated Aug. 25, 2020 re: Application No. 10-2019-0087930, pp. 1-6.

CN search reprot dated Apr. 8, 2021 re: Application No. 201810961926.5.

KR second Office Action dated Feb. 18, 2021 re: Application No. 10-2019-0087930.

* cited by examiner

IMAGE PROCESSING METHOD AND DEVICE

CROSS-REFERENCE TO RELATED APPLICATIONS

The disclosure claims priority of Chinese Patent Application No. 201810961926.5, filed to China Patent Office on Aug. 22, 2018. Contents of the disclosure are hereby incorporated by reference in entirety of the Chinese Patent Application.

TECHNICAL FIELD

The embodiments of the disclosure relates to image processing technologies, and in particular to an image processing method and device.

BACKGROUND

Due to a unstable light source (for example, in daily lighting, because a power supply is an alternating current (AC), a brightness of the light source will change with an amplitude of the AC), videos captured by cameras (including digital cameras, mobile phone cameras, etc.) will appear bright and dark fluctuations between frames as the light source changes, and even appear color fluctuations. This phenomenon is particularly evident when a shooting frame rate (namely a frame rate used when shooting videos, so as to distinguish the shooting frame rate from a frame rate used when playing the videos) is a high frame rate (greater than or equal to 240 frames per second).

At present, fora video with a light source frequency of 60 Hz and a frame rate of 240 frames per second, a phenomenon of the brightness and color fluctuations of the video can be significantly improved by superimposing and averaging two adjacent frames. In principle, as long as the video is shot at an integer multiple of the light source frequency, the phenomenon of the brightness fluctuations (namely a phenomenon that an average brightness of each frame of image or a brightness of each, pixel in each frame of the image of the video appears bright and dark fluctuations along with frame changes) and the phenomenon of the color fluctuations (namely a phenomenon that a color fluctuates as the brightness changes due to inconsistent brightness fluctuations of each color channel) can be improved by superimposing adjacent frames.

However, this scheme performs a significant effect on the video where the shooting frame rate is an integer multiple of the light source frequency, and does not have obvious effect to other videos. And, when there is a fast moving object exists during video shooting, the video processed by this scheme will have a ghost image of this fast moving object.

SUMMARY

At least some embodiments of the disclosure provide an image processing method and device, so as at least to partially solve a problem how to eliminate brightness or color fluctuations existed in a video in the related art.

In an embodiment of the disclosure, an image processing method is provided, which includes:
performing brightness adjustment on each frame of image in a video;
performing offset compensation on each frame of the image after the brightness adjustment; and
performing time domain filtering on pixels of each frame of the image after the offset compensation.

In an optional embodiment, performing the brightness adjustment on each frame of the image in the video including:
performing the following steps on each frame of the image:
calculating a color average value of each of three color channels respectively, the three color channels referring to a red R channel, a green G channel and a blue B channel; and
performing first time domain filtering on each of three color channels according to the color average value corresponding to each of three color channels by using a preset first filtering scheme.

In an optional embodiment, performing the offset compensation on each frame of the image after the brightness adjustment including:
acquiring an offset between any two adjacent frames of images in the video after the brightness adjustment, and compensating the offset by using a preset offset compensation algorithm to make image contents of any two adjacent frames of images in the video at the same image coordinate be consistent with each other.

In an optional embodiment, performing the time domain filtering on the pixels of each frame of the image after the offset compensation including:
performing second time domain filtering on each pixel in each frame of the image by a preset second filtering scheme to linearly superimpose a current frame of image and a previous frame of image preceding the current frame of image.

In an optional embodiment, the method further includes:
determining whether at least one moving object is contained in each frame of the image after performing the offset compensation on each frame of the image after brightness adjustment.

In an optional embodiment, determining whether the at least one moving object is contained in each frame of the image including:
dividing a current frame of image and a previous frame of image into blocks separately to obtain multiple first block images;
calculating a difference between a first block image corresponding to the current frame of the image and a first block image corresponding to the previous frame of the image separately according to a preset difference calculation algorithm;
comparing the difference between the two first block images with a preset difference threshold value;
determining, when the difference between the two first block images is greater than or equal to the preset difference threshold value, that the two first block images are non-similar, and determining that image regions in the two first block images corresponding to the current frame of the image and the previous frame of the image contain at least one moving object;
determining, when the difference between the two first block images is less than the preset difference threshold value, that the two first block images are similar, and determining that the image regions in the two first block images corresponding the current frame of the image and the previous frame of the image do not contain the moving object.

In an optional embodiment, acquiring the offset between any two adjacent frames of images in the video after the brightness adjustment including:

dividing a current frame of image after the brightness adjustment and a previous frame of image after the brightness adjustment separately into multiple second block images;

calculating an offset between a second block image corresponding to the current frame of the image and a second block image corresponding to the previous frame of the image;

eliminating at least one second block image containing the at least one moving object from the multiple second block images, and taking an average value of offsets of the remaining second block images as an offset between the current frame of the image and the previous frame of the image.

In an optional embodiment, the method further includes:

after determining that any frame, of image contains at least one moving object, generating a mask image of this frame of the image, and a pixel value of each pixel of an image region containing the at least one moving object in the mask image is 1, and the pixel value of each pixel of another image region not containing the at least one moving object is 0;

fusing, according to a preset fusion algorithm, at least one frame of image of which pixels are processed by time domain filtering and at least one frame of image of which pixels are not processed by the time domain filtering by using the mask image to preserve the image region containing the at least one moving object.

In an optional embodiment, the method further includes:

performing spatial filtering on each frame of fused image.

In another embodiment of the disclosure, an image processing device is provided, including a processor and a computer readable storage medium, the computer readable storage medium storing instructions, and instructions are executed by the processor to implement the image processing method as claimed in any of above-mentioned method embodiments.

Through at least some embodiments of the disclosure, the brightness adjustment is performed on each frame of the image in the video, the offset compensation is performed on each frame of the image after the brightness adjustment, and the time domain filtering is performed on pixels of each frame of the image after the offset compensation, thereby the brightness or color fluctuations existed in the video being effectively removed.

Other characteristics and advantages of the embodiments of the disclosure shall be stated in the subsequent description, and would become apparent in the description partially, or would be known through implementation of the embodiments of the disclosure. The objectives and other advantages of the embodiments of the disclosure may be implemented and acquired by structures which are specifically pointed out in the description, claims and drawings.

BRIEF DESCRIPTION OF THE DRAWINGS

The accompanying drawings are used to provide further understanding of the technical solution of the embodiments of the disclosure, and are part of the description. The drawings are used to jointly with the embodiments of the application to explain the technical solution of the embodiments of the disclosure rather than limit the technical solution of the embodiments of the disclosure.

DETAILED DESCRIPTION

In order to make the objective, the technical solution and the advantages of the embodiments of the disclosure more clearly, the embodiments of the disclosure will be described below in combination of drawings in detail. It is to be noted that the embodiments and the characteristics in the embodiments can be randomly combined on the premise that no conflict occurs.

Steps that are shown in a flowchart of each drawing may be implemented in a computer system, for example, capable of implementing a group of computer executable instructions. In addition, although the flowchart shows a logic order, the shown or described steps may be implemented with an order which is different from the logic order under some circumstances.

Embodiment One

Figure 1:
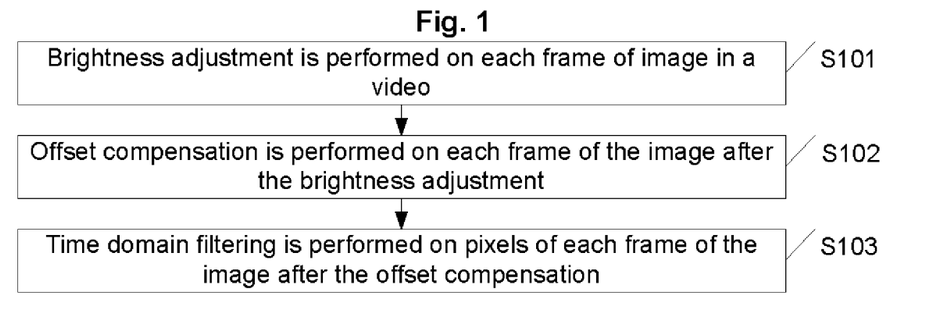
FIG. 1 is a flowchart of an image processing method according to an embodiment of the disclosure.

In this embodiment, an image processing method is provide. As shown in FIG. 1, the image processing method includes steps S101-S103.

At step S101, brightness adjustment is performed on each frame of image in a video.

At step S102, offset compensation is performed on each frame of the image after the brightness adjustment.

At step S103, time domain filtering is performed on pixels of each frame of the image after the offset compensation.

In this embodiment of the disclosure, for each frame of the image in the video, the overall brightness adjustment is first performed on each frame of the image. And then an image matching is performed, that is the offset compensation is performed on each frame of the image after the brightness adjustment. And the time domain filtering is performed according to the result of the image matching, which effectively reduces the brightness fluctuation effect generated by the high-speed shooting video under the fluctuating light source, and removes the brightness or color fluctuations existed in the video.

In this embodiment of the disclosure, the method, the algorithm, and the device for the specific brightness adjustment, the image matching, and the time domain filtering are not limited, and may be implemented by any existing methods, algorithms, or devices according to different application scenarios.

In this embodiment of the disclosure, it should be noted that the solution of this embodiment may be applied to a video of a high frame rate (such as greater than or equal to 240 frames per second), which may include but is not limited to a frame rate greater than or equal to 240, frames per second, and less than or equal to 960 frames per second. The frequency of the light source may include but is not limited to 60 Hz and 50 Hz. Any video that may adopt the solution of this embodiment of the disclosure is within the protection scope of the embodiments of the disclosure.

Embodiment Two

This embodiment provides a specific implementation of the brightness adjustment based on the embodiment one.

Figure 2:
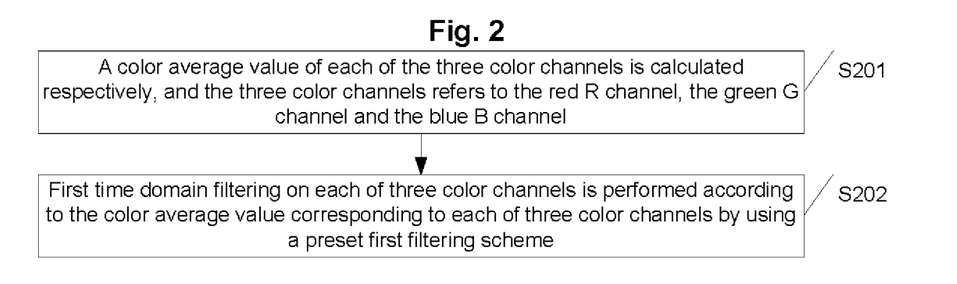
FIG. 2 is a flowchart of a method for adjusting brightness of each frame of image in a video according to an embodiment of the disclosure.

In this embodiment of the disclosure, as shown in FIG. 2, the step of performing the brightness adjustment on the each frame of the image in the video may include: performing the following steps S201-S202 on each frame of the image.

At step S201, a color average value of each of the three color channels is calculated respectively, and the three color channels refer to the red R channel, the green G channel and the blue B channel.

At step S202, first time domain filtering on each of three color channels is performed according to the color average value corresponding to each of three color channels by using a preset first filtering scheme.

In this embodiment of the disclosure, for each frame of the image, the color average value of each of the three color channels is respectively calculated, and the color average value of each of the three RGB color channels of the current frame of the image is assumed to be Rt, Gt and Bt respectively. The first domain filtering may be performed on the color average value of each of the three color channels respectively by using a preset first filtering scheme.

In this embodiment of the disclosure, the first filtering scheme may be but is not limited to a finite impulse response filter or an infinite impulse response filter.

In this embodiment of the disclosure, $R_t$ is taken as an example to explain how to perform the time domain filtering by the finite impulse response filter. It is assumed that $R_{t-i}$ is the color average of the R channel of a image which is i frames preceding the current frame of the image. And the time domain filtering is performed on the color average of the R channel may be described by following equation:

$$R_{t\_tf} = \sum_{i=0}^{t-1} \beta_i R_{t-i}$$

And $R_{t\_tf}$ is a result of an operation of performing the time domain filtering on the R channel, and $\beta_i$ is a filter coefficient. Let $$\omega = \frac{R_{t\_tf}}{R_t},$$

the pixel value of the R channel in each pixel in the current frame of the image is multiplied by ω to obtain the pixel value of the R channel in each pixel in the current frame of the image.

In this embodiment of the disclosure, similar operations are performed on other channels (namely G channel and B channel) to perform the time domain filtering on the color average value of each color channel in each pixel in the current frame of the image, and the result of the time domain filtering is used for adjusting the pixel value of each color channel in the each pixel, thereby realizing brightness adjustment on the each frame of the image in the video, which will not be repeated here.

Embodiment Three

This embodiment provides a specific implementation of image matching based on the embodiment one or the embodiment two.

In this embodiment of the disclosure, the step of performing the offset compensation on the each frame of the image after the brightness adjustment may include: acquiring an offset between any two adjacent frames of images in the video after the brightness adjustment by using a preset offset compensation algorithm to make image contents of any two adjacent frames of images in the video at the same image coordinate be consistent with each other.

In this embodiment of the disclosure, due to shaking of the camera (such as the shaking of the camera caused by shaking of hands when holding the camera), the current frame of the image has a certain offset with respect to the previous frame of the image, thus causing the image contents in the two frames of images at the same image coordinate to be inconsistent, which will adversely affect the subsequent image time domain filtering. In addition to the offset, there may be a rotation of the camera, but when two adjacent frames of images are considered, the rotation of the camera may be ignored. The purpose of the image matching is to find the offset between two frames of images, and to eliminate the inconsistency of the image contents after the offset compensation.

In this embodiment of the disclosure, an expression of making the image contents of any two adjacent frames of images in the video at the same image coordinate be consistent with each other may refer to that positions of regions having the same content in any two adjacent frames of images are the same, or an offset between the positions of regions having the same content in any two adjacent frames of images is less than or equal to a preset offset threshold, at the same image coordinate between any two adjacent frames of images.

In this embodiment of the disclosure, the offset compensation algorithm may include but is not limited to at least one of a template matching algorithm and a feature point based matching algorithm. These two offset compensation algorithms will be described in detail below.

In this embodiment of the disclosure, the simplest offset compensation algorithm may be a classic template matching algorithm. A basic principle of the template matching algorithm may be simply described as follows: intercepting a region of the same size as a template image from a reference image to take this region as an interception image; comparing the template image with the interception image to calculate an image difference between the template image and the interception image. And technical indicators for evaluating the image difference may include but is not limited to: normalized cross-correlation, average of absolute errors, square sum of errors, and sum of absolute errors and so on. A range of a starting position of the interception image in the reference image may be manually set, the image difference between each interception image and the template image may be calculated, and the starting position of the interception image corresponding to the smallest difference, is taken as the offset of the template image with respect to the reference image.

In this embodiment of the disclosure, a basic principle of the feature point based matching algorithm may be simply described as follows: extracting feature points in the two frames of images to be matched separately, obtaining the feature point matching pairs by the feature point matching algorithm, and calculating the offset between two frames of images according, to the feature point matching pairs.

In this embodiment of the disclosure, there are many algorithms for extracting the feature points. For example, the algorithms may include but are not limited to the classic Scale-invariant feature transform (SIFT) algorithm, HARRIS algorithm, etc.

In this embodiment or the disclosure, the feature point matching algorithm may include but is not limited to SIFT algorithm, Speeded Up Robust Features (SURF) algorithm, etc.

In this embodiment of the disclosure, in addition to calculating the offset between the two frames of images according to the these feature point pairs, optical flows of the feature points may also be obtained according to the these feature point pairs (for example, by using classic Lucas-Kanade algorithm), at least one abnormal optical flow of the feature points may be eliminated (by a simple method of setting a threshold value, one part of the optical flows greater than or equal to the threshold value is considered to be at least one abnormal optical flow, and another part of the optical flows less than the threshold value is considered to be at least one normal optical flow), and the remaining optical flows of the feature points are averaged as an offset of an entire image.

Embodiment Four

This embodiment provides another specific implementation for obtaining an offset of each frame of the image to eliminate influence of the at least one moving object on the offset compensation process based on the embodiment three.

Figure 3:
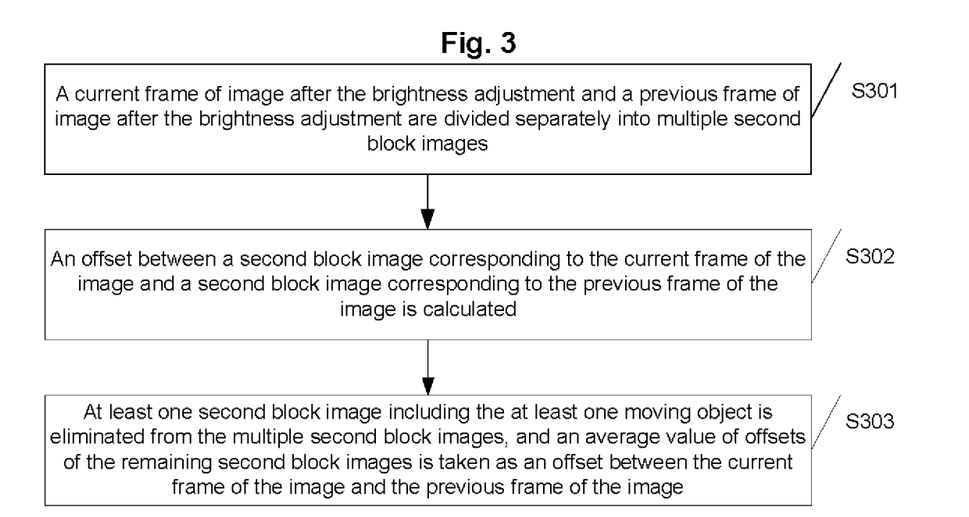
FIG. 3 is a flowchart of a method for acquiring an offset between two adjacent frames of images in a brightness-adjusted video according to an embodiment of the disclosure.

In this embodiment of the disclosure, as shown in FIG. 3, the step of acquiring the offset between any two adjacent frames of images in the video after the brightness adjustment may include steps S301 to S303.

At step S301, a current frame of image after the brightness adjustment and a previous frame of image after the brightness adjustment are divided separately into multiple second block images.

At step S302, an offset between a second block image corresponding to the current frame of the image and a second block image corresponding to the previous frame of the image is calculated.

At step S303, at least one second block image containing the at least one moving object is eliminated from the multiple second block images, and an average value of offsets of the remaining second block images is taken has an offset between the current frame of the image and the previous frame of the image.

In this embodiment of the disclosure, in order to eliminate influence of the at least one moving object on the offset compensation, the current frame of the image after the brightness adjustment and the previous frame of the image after the brightness adjustment are firstly divided into blocks. An offset corresponding to each image block (i.e., the above mentioned second block image) may be separately calculated to determine at least one image block being affected by the at least one moving object. And then, the at least one image block being affected by the at least one moving object is to be eliminated, and offsets of the remaining image blocks are averaged as the offset of the entire image.

Embodiment Five

This embodiment provides a specific implementation for further performing time domain filtering on the video after offset compensation based on the embodiment three or the embodiment four.

In the embodiments of the disclosure, the step of performing the time domain filtering on the pixels of each frame of the image after the offset compensation may include: performing second time domain filtering on each pixel in each frame of the image by a preset second filtering scheme to linearly superimpose a current frame of image and a previous frame of image preceding the current frame of image.

In this embodiment of the disclosure, the time domain filtering (i.e., the second time domain filtering) at this step is similar to the time domain filtering (i.e., the first time domain filtering) at step S101, except that the time domain filtering is performed on each pixel at this step.

In this embodiment of the disclosure, it needs to be noted that the first time domain filtering and the second time domain filtering are used for distinguishing the time domain filtering in two different steps, but are not used for limiting the specific schemes and implementation order of the two time domain filtering. The first time domain filtering and the second time domain filtering may adopt the same or different time domain filtering schemes.

In this embodiment of the disclosure, the second filtering scheme may include but is not limited to a finite impulse response filter for an infinite impulse response filter.

In this embodiment of the disclosure, the following will take the finite impulse response filter to perform filtering as an example for detailed description. Specifically, the finite impulse response filter may be achieved by the following equation:

$$I_{t\_tf}(x, y) = \sum_{i=0}^{t-1} \alpha_i I_{t-i}(x, y)$$

And $I_t$ is the current frame of image, $I_{t-i}$ is an image which is i frames preceding the current frame of image, $I_1$ is the first frame of image in the video, $I_{t\_tf}$ is a result of the time domain filtering, (x,y) is a pixel coordinate of each frame of the image, $\alpha_i$ is a filtering coefficient.

In this embodiment of the disclosure, the time domain filtering is performed on each frame of the image in the video, and a filtering result is a linear superposition of the current frame of the image and a historical frame of the image (i.e., a frame of image preceding the current frame of the image).

Embodiment Six

In order to protect the at least one moving object in the video from being blurred or appearing ghost phenomenon, and implement the above described four embodiments successfully, this embodiment provides a specific implementation for determining whether the at least one moving object is contained in each frame of the image based on the embodiment three or the embodiment four.

In this embodiment of the disclosure, the method may further include the following step: determining whether at least one moving object is contained in each frame of the image after performing the offset compensation on each frame of the image after the brightness adjustment.

Figure 4:
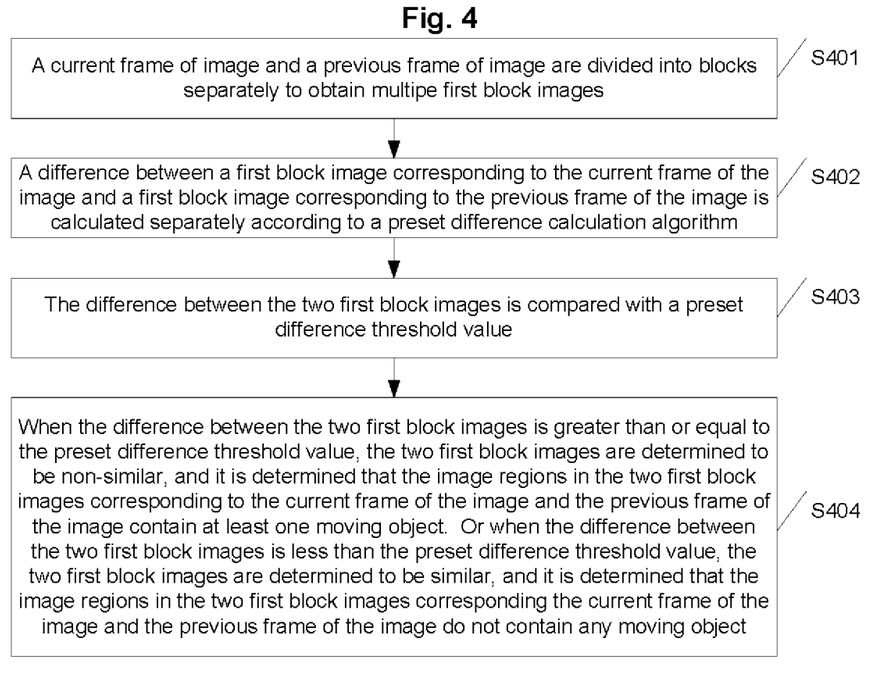
FIG. 4 is a flowchart of a method for determining whether a moving object is contained in an image according to an embodiment of the disclosure.

In this embodiment of the disclosure, as shown in FIG. 4, the step of determining whether the at least one moving object is contained in each frame of the image may include steps S401 to S404.

At step S401, a current frame of image and a previous frame of image are divided into blocks separately to obtain multiple first block images.

At step S402, a difference between a first block image corresponding to the current frame of the image and a first block image corresponding to the previous frame of the image is calculated separately according to a preset difference calculation algorithm.

At step S403, the difference between the two first block images is compared with a preset difference threshold value.

At step S404, when the difference between the two first block images is greater than or equal to the preset difference threshold value, the two first block images are determined to be non-similar, and it is determined that the image regions in the two first block images corresponding to the current frame of the image and the previous frame of the image contain at least one moving object. Or when the difference between the two first block images is less than the preset difference threshold value, the two first block images are determined to be similar, and it is determined that the image regions in the two first block images corresponding the current frame of the image and the previous frame of the image do not contain any moving object.

In this embodiment of the disclosure, before comparing the current frame of the image with the previous frame of the image, the current frame of the image and the previous frame of the image are firstly divided into blocks. And then within each small block, the difference between the current frame of the image and the previous frame of the image is calculated (the difference may be obtained by using, but not limited to, normalized cross-correlation, average of absolute errors, square sum of errors, and sum of absolute errors, etc.), and a preset threshold value may be used for determining whether the two frames of images are similar within the small block. When the difference is greater than or equal to the threshold value, the two frames of images are determined to be non-similar. When the difference is less than the threshold value, the two frames of images are determined to be similar. If the determining result is non-similar, the region is considered to contain at least one moving object, otherwise the region is considered to not contain any moving object.

In this embodiment of the disclosure, it needs to be noted that the first block image in this embodiment and the second block image in the previous embodiment are two different titles or labels, mainly for distinguishing the block images obtained in two dividing operations for different purposes to avoid confusion, but not for distinguish any orders, sizes or other properties.

In this embodiment of the disclosure, it needs to be noted that this step may be performed after compensating the offset of each frame of image after brightness adjustment, or before compensating the offset of each frame of image after brightness adjustment, and no specific limitations on the specific implementation time and order.

Embodiment Seven

In order to protect the at least one moving object in the video from being blurred or appearing ghost phenomenon, this embodiment provides a further implementation based on the embodiment six.

Figure 5:
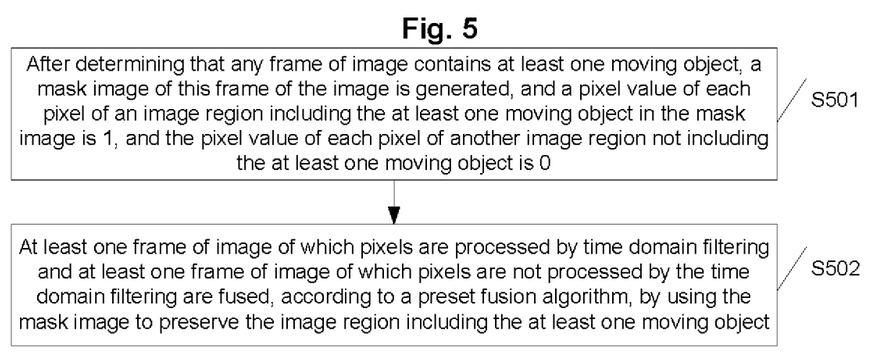
FIG. 5 is a flowchart of a method for implementing image fusion on images containing moving objects according to an embodiment of the disclosure.

In this embodiment of the disclosure, as shown in FIG. 5, the method further includes steps S501 to S502.

At step S501, after determining that any frame of image contains at least one moving object, a mask image of this frame of the image is generated, and a pixel value of each pixel of an image region containing the at least one moving object in the mask image is 1, and the pixel value of each pixel of another image region not containing the at least one moving object is 0.

At step S502, at least one frame of image of which pixels are processed by time domain filtering (i.e., the second time domain filtering) and at least one frame of image of which pixels are not processed by the time domain filtering (i.e., the second time domain filtering) are fused, according to a preset fusion algorithm, by using the mask image to preserve the image region containing the at least one moving object.

In this embodiment of the disclosure, when any frame of image is determined to contain at least one moving object, a mask image $M_t$ of this frame of image may be generated. And the mask image $M_t$ is a binary image. The pixel value of each pixel of an image region containing the at least one moving object is 1, and the pixel value of each pixel of the image region not containing the at least one moving object is 0.

In this embodiment of the disclosure, according to the determination result of the at least one moving object, the mask image $M_t$ is used for fusing the corresponding frame of image being processed by time domain filtering and the corresponding frame of image not being processed by time domain filtering, so as to preserve the image region containing the at least one moving object, and eliminate the phenomenon of blurring and ghosting caused by time domain filtering on the at least one moving object.

In this embodiment of the disclosure, the corresponding frame of image being processed by time domain filtering (i.e., the second time domain filtering) and the corresponding frame of image not being processed by time domain filtering are both refer to the frames of images corresponding to the above mentioned mask image.

In this embodiment of the disclosure, image fusion may be achieved according to the mask image $M_t$ by following equation:

$$I_b(x,y)=(1-M_t(x,y))*I_{t\_tf}(x,y)+M_t(x,y)*I_t(x,y)$$

And $I_b$ is a fusion result, $I_{t\_tf}$ is a result of time domain filtering on the current frame of the image, $I_t$ is the current frame of the image, x and y are coordinates of an image.

In this embodiment of the disclosure, through the above equation, the current frame of the image being processed by the time domain filtering and the current frame of the image not being processed by the time domain filtering are simply superimposed. That is the region containing the at least one moving object adopts the pixel value of each pixel of the current frame of the image, and the region not containing the at least one moving object adopts the pixel value of the result obtained by the time domain filtering.

In this embodiment of the disclosure, the preset fusion algorithm may further include a classic Laplace Pyramid Fusion Algorithm.

In this embodiment of the disclosure, a basic principle of the classic Laplace Pyramid Fusion Algorithm is as follows.

A series of blurred images $G_0, G_1 \ldots G_n$ are generated, and $G_0$ is an original image, and each subsequent image $G_i$ is generated by convolutional blurring and downsampling an upper layer image $G_{i-1}$. For example, $G_1$ is generated by convolutional blurring and downsampling $G_0$, and the convolutional blurring kernel usually adopts Gaussian kernel, so the series of images is also called Gaussian pyramid. For the sake of simplicity, the Gaussian pyramid is used here for representing the sequence of blurred images $G_0, G_1 \ldots G_n$, although the blurred image sequence is sometimes not generated by the Gaussian blurring kernel. Assuming that the Laplacian pyramid is labeled as $L_0, L_1 \ldots L_n$, the image of each layer of the Laplacian pyramid may be obtained by this equation: $L_i = G_i - \text{expand}(G_{i+1})$, and the expand function may be understood as upsampling. That is, each layer of the Laplacian pyramid is obtained by subtracting the upsampled image of the next layer in the Gaussian pyramid from the image corresponding to the layer in the Gaussian pyramid. It is worth noting that the last layer $L_n = G_n$. Reconstructing image through the Laplacian pyramid is an inverse process of the above mentioned process. So the steps of fusion through the Laplacian pyramid can be described as follows.

At one, Laplacian pyramids $LI_{t\_tf}$ and $LI_t$ are constructed for the result after time domain filtering $I_{t\_tf}$ and the current frame of the image $I_t$.

At two, Gaussian pyramid $GM_t$ are constructed for the mask image $M_t$.

At three, a new Laplacian pyramid LS is constructed as follows:
$LS_l(x,y) = (1 - GM_{t,l}(x,y)) LI_{t\_tf,l}(x,y) + GM_{t,l}(x,y) LI_{t,l}(x,y)$.
And l is a subscript of a layer number of a pyramid, which is a positive integer, x and y are coordinates of an image.

At four, the result image is obtained by LS reconstruction image.

Embodiment Eight

In order to remove a residual image left after the above steps, this embodiment provides a further implementation based on the embodiment seven.

In this embodiment of the disclosure, the method may also include the following step: performing spatial filtering on each frame of fused image.

In this embodiment of the disclosure, the time domain filtering refers to filtering between two frames of images, while the spatial filtering refers to filtering on a single frame of image, mainly for removing the residual image left after the above steps.

In this embodiment of the disclosure, the spatial filtering method may include but is not limited to edge preserved filter, such as guided filter, bilateral filter, etc. A final result is obtained by performing the spatial filtering on the fused result of images.

Embodiment Nine

This embodiment provides a specific implementation for processing the video image on the basis of zooming out the video image based on any above described embodiments.

Figure 6:
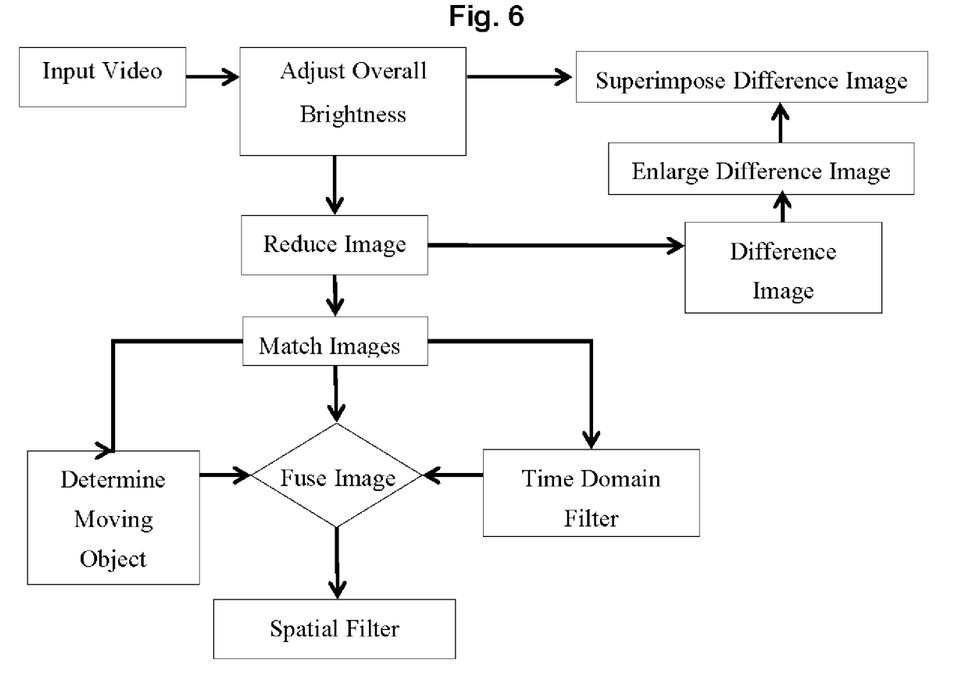
FIG. 6 is a flowchart of a method for processing a video image on the basis of zooming out the video image according to an embodiment of the disclosure.

In this embodiment of the disclosure, a main flow of the embodiment nine is basically the same as the embodiment one to embodiment eight, and a main difference is that most of operations in the embodiment nine are performed on small images. The flow chart is shown in FIG. 6. Specifically, the image is zoomed out after the overall brightness adjustment, and the image after the overall brightness adjustment is marked as $I_o$, and the image by zooming put $I_o$ is marked as $I_s$. Then image matching (i.e., offset compensation), second time domain filtering, moving object determining, image fusion, spatial filtering (these steps are the same as the embodiment one to embodiment eight are performed on $I_s$, and the result is marked as $I_{sf}$. Thereby obtaining difference diagram $\Delta I_s$: $\Delta I_s(x,y) = I_{sf}(x,y) - I_s(x,y)$, and x and y are coordinates of an image. Then a difference diagram $\Delta I_s$ is enlarged to the same size as $I_o$, to obtain the enlarged difference diagram $\Delta I$, and $\Delta I$ is superimposed on $I_o$ to obtain the final result $I_r$, and x and y are coordinates of an image:

$I_r(x,y) = I_o(x,y) + \Delta I(x,y)$

In this embodiment of the disclosure, most of the processing is performed on the reduced image, and then the difference diagram between the result after processing and the small image before processing is enlarged and applied to the big image, the scheme of the embodiment can significantly reduce the operation time under the premise of ensuring the effect.

Embodiment Ten

Figure 7:
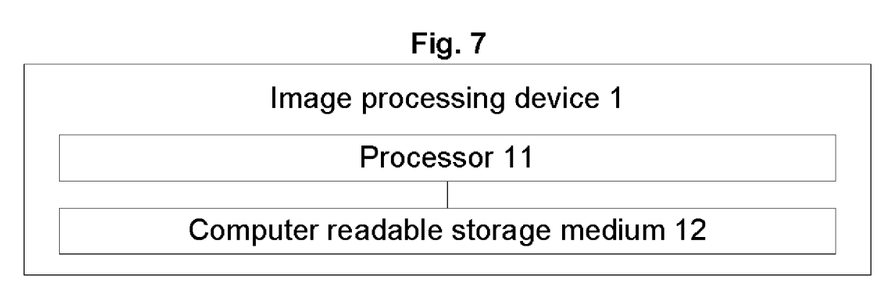
FIG. 7 is a structural block diagram of an image processing device according to an embodiment of the present invention.

An image processing device 1, as shown in FIG. 7, includes: a processor 11 and a computer readable storage medium 12. The computer readable storage medium 12 stores instructions, and instructions are executed by the processor 11 to implement the image processing method described in any of the above embodiments.

The any of the above embodiments of the disclosure at least includes the following steps: performing brightness adjustment on each frame of image in the video; performing offset compensation on each frame of the image after the brightness adjustment; and performing time domain filtering on pixels of each frame of the image after the offset compensation. With the scheme of any of the above embodiments, the brightness or color fluctuations existed in the video is effectively removed, and the at least one moving object is well preserved to protect the at least one moving object from being blurred, and appearing any residual or ghost image.

At least some embodiments of the disclosure may be applied to at least one of static images and dynamic images (such as a video), and may be further applied to an image processing device with any appropriate type, such as a digital camera, a mobile phone, an electric equipment integrated with the digital camera, a security or video monitoring system, a medical imaging system and so on.

Combined with Hardware

Those of ordinary skill in the art will appreciate that all or some of the steps, systems, and functional blocks/elements of the device in the methods disclosed above may be implemented as software, firmware, hardware, and suitable combinations thereof. In a hardware implementation, the division between functional blocks/elements mentioned in the above description does not necessarily correspond to the division of physical components; for example, one physical component may have multiple functions, or one function or step may be co-executed by several physical components. Some or all of the components may be implemented as software executed by a processor, such as a digital signal processor or microprocessor, or as hardware, or as an integrated circuit, such as an application specific integrated circuit. Such software may be distributed on a computer readable medium, which may include computer storage media (or non-transitory media) and communication media (or transitory media). As is well known to those of ordinary skill in the art, the term computer storage medium includes volatile and nonvolatile, removable and non-removable media implemented in any method or technology for storing information (such as computer readable instructions, data structures, program modules or other data). Computer storage media includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage device, or may any other medium used to store the desired information and that can be accessed by the computer. Moreover, it is well known to those of ordinary skill in the art that communication media typically includes computer readable instructions, data structures, program modules, or other data in a modulated data signal, such as a carrier wave or other transport mechanism, and can include any information delivery media.

What is claimed is:

1. An image processing method, comprising:
   performing brightness adjustment on each frame of image in a video;
   performing offset compensation on each frame of the image after the brightness adjustment; and
   performing time domain filtering on pixels of each frame of the image after the offset compensation;
   wherein the method further comprises:
   zooming out each whole frame of image after the brightness adjustment automatically;
   obtaining zoomed out image of each frame after multiple processing by matching, second time domain filtering, moving object determining, image fusion, spatial each whole frame of zoomed out image;
   obtaining a difference diagram according to the zoomed out image of each frame after multiple processing and the zoomed out image of each frame after the brightness adjustment automatically;
   obtaining an enlarged difference diagram by zooming in the difference diagram to the same size as the zoomed out image of each frame after the brightness adjustment automatically;
   obtaining a final result by superimposing the enlarged difference diagram on each frame image after the brightness adjustment automatically.

2. The image processing method as claimed in claim 1, wherein performing the brightness adjustment on each frame of the image in the video comprising:
   performing the following steps on each frame of the image:
   calculating a color average value of each of three color channels respectively, the three color channels referring to a red R channel, a green G channel and a blue B channel; and
   performing first time domain filtering on each of three color channels according to the color average value corresponding to each of three color channels by using a preset first filtering scheme.

3. The image processing method as claimed in claim 1, wherein performing the offset compensation on each frame of the image after the brightness adjustment comprising:
   acquiring an offset between any two adjacent frames of images in the video after the brightness adjustment, and compensating the offset by using a preset offset compensation algorithm to make image contents of any two adjacent frames of images in the video at the same image coordinate be consistent with each other.

4. The image processing method as claimed in claim 1, wherein performing the time domain filtering on the pixels of each frame of the image after the offset compensation comprising:
   performing second time domain filtering on each pixel in each frame of the image by a preset second filtering scheme to linearly superimpose a current frame of image and a previous frame of image preceding the current frame of image.

5. The image processing method as claimed in claim 3, wherein the method further comprises:
   determining whether at least one moving object is contained in each frame of the image after performing the offset compensation on each frame of the image after the brightness adjustment.

6. The image processing method as claimed in claim 5, wherein determining whether the at least one moving object is contained in each frame of the image comprising:
   dividing a current frame of image and a previous frame of image into blocks separately to obtain a plurality of first block images;
   calculating a difference between a first block image corresponding to the current frame of the image and a first block image corresponding to the previous frame of the image separately according to a preset difference calculation algorithm;
   comparing the difference between the two first block images with a preset difference threshold value;
   determining, when the difference between the two first block images is greater than or equal to the preset difference threshold value, that the two first block images are non-similar, and determining that image regions in the two first block images corresponding to the current frame of the image and the previous frame of the image contain at least one moving object; and
   determining, when the difference between the two first block images is less than the preset difference threshold value, that the two first block images are similar, and determining that the image regions in the two first block images corresponding the current frame of the image and the previous frame of the image do not contain any moving object.

7. The image processing method as claimed in claim 3, wherein acquiring the offset between any two adjacent frames of images in the video after the brightness adjustment comprising:
   dividing a current frame of image after the brightness adjustment and a previous frame of image after the brightness adjustment separately into a plurality of second block images;
   calculating an offset between a second block image corresponding to the current frame of the image and a second block image corresponding to the previous frame of the image; and
   eliminating at least one second block image comprising the at least one moving object from the plurality of second block images, and taking an average value of offsets of the remaining second block images as an offset between the current frame of the image and the previous frame of the image.

8. The image processing method as claimed in claim 6, wherein the method further comprises:
   after determining that any frame of image contains at least one moving object, generating a mask image of this frame of the image, wherein a pixel value of each pixel of an image region comprising the at least one moving object in the mask image is 1, and the pixel value of each pixel of another image region not comprising the at least one moving object is 0; and fusing, according to a preset fusion algorithm, at least one frame of image of which pixels are processed by time domain filtering and at least one frame of image of which pixels are not processed by the time domain filtering by using the mask image to preserve the image region comprising the at least one moving object.

9. The image processing method as claimed in claim 8, wherein the method further comprises:

performing spatial filtering on each frame of fused image.

10. An image processing device comprising a processor and a computer readable storage medium, the computer readable storage medium storing instructions, wherein instructions are executed by the processor to implement the image processing method as claimed in claim 1.

11. The image processing method as claimed in claim 2, wherein the preset first filtering scheme comprises one of the followings:

a finite impulse response filter or an infinite impulse response filter.

12. The image processing method as claimed in claim 3, wherein an expression of making the image contents of any two adjacent frames of images in the video at the same image coordinate be consistent with each other refers to that positions of regions having the same content in any two adjacent frames of images are the same, or an offset between the positions of regions having the same content in any two adjacent frames of images is less than or equal to a preset offset threshold, at the same image coordinate between any two adjacent frames of images.

13. The image processing method as claimed in claim 3, wherein the preset offset compensation algorithm comprises at least one of a template matching algorithm and a feature point based matching algorithm.

14. The image processing method as claimed in claim 13, wherein the template matching algorithm comprises the following steps:

intercepting a region of the same size as a template image from a reference image to take this region as an interception image; and comparing the template image with the interception image to calculate an image difference between the template image and the interception image.

15. The image processing method as claimed in claim 14, wherein a range of a starting position of the interception image in the reference image is manually set to calculate the image difference between each interception image and the template image, and the starting position of the interception image corresponding to the smallest difference is taken as the offset of the template image with respect to the reference image.

16. The image processing method as claimed in claim 13, wherein the feature point based matching algorithm comprises the following steps:

extracting feature points in the two frames of images to be matched separately;

obtaining the feature point matching pairs by the feature point matching algorithm; and calculating the offset between two frames of images according to the feature point matching pairs.

17. The image processing method as claimed in claim 16, wherein the method further comprises:

obtaining optical flows of the feature points according to the these feature point pairs; and eliminating at least one abnormal optical flow of the feature points and averaging the remaining optical flows of the feature points as an offset of an entire image.

18. The image processing method as claimed in claim 4, wherein the preset second filtering scheme comprises one of the followings:

a finite impulse response filter or an infinite impulse response filter.

19. The image processing method as claimed in claim 8, wherein the mask image is a binary image.

20. The image processing method as claimed in claim 8, wherein the preset fusion algorithm comprises: a Laplace Pyramid Fusion Algorithm.

* * * * *